United States Patent [19]
Snoeren et al.

[11] Patent Number: 5,418,831
[45] Date of Patent: May 23, 1995

[54] X-RAY EXAMINATION APPARATUS

[75] Inventors: Rudolph M. Snoeren; Antonius J. F. Van Bussel, both of Eindhoven, Netherlands

[73] Assignee: U.S. Philips Corporation, New York, N.Y.

[21] Appl. No.: 94,276

[22] Filed: Jul. 19, 1993

[30] Foreign Application Priority Data

Jul. 17, 1992 [EP] European Pat. Off. ............ 92202191

[51] Int. Cl.$^6$ .......................................... G01M 23/04
[52] U.S. Cl. ................... 378/98.3; 378/98.2; 378/98.7
[58] Field of Search ............ 378/98.2, 98.3, 98.7, 378/98.8; 348/258, 261

[56] References Cited

U.S. PATENT DOCUMENTS

| | | | |
|---|---|---|---|
| 4,215,365 | 7/1980 | Haendle et al. | 378/98.2 X |
| 4,216,494 | 8/1980 | Ohshima et al. | 348/259 |
| 4,359,759 | 11/1982 | McBride et al. | |
| 4,794,630 | 12/1988 | Ploix | 378/98.2 X |

FOREIGN PATENT DOCUMENTS

| | | | |
|---|---|---|---|
| 57-053745 | 3/1982 | Japan | G03B 41/16 |
| 58-18372 | 10/1983 | Japan | H04N 5/32 |
| 63-178499 | 7/1988 | Japan | H05G 1/64 |

*Primary Examiner*—David P. Porta
*Attorney, Agent, or Firm*—Jack D. Slobod

[57] ABSTRACT

An X-ray examination apparatus includes an X-ray source (10) and an image intensifier (30) with an imaging screen (32). The imaging screen (32) is imaged on the pick-up face (51) of an image pick-up device (50), for example a television camera. In order to adjust or maintain the optimum response time of the image pick-up device (50) to or at the desired level, the pick-up face (51) is illuminated by means of a number of illumination elements (145). In order to achieve a compact construction of the apparatus, the illumination elements (145) are accommodated in recesses (144) in a transparent element (141). The light of the illumination elements (145) is then reflected from the entrance face (142) facing the image intensifier (30) and/or from the sides (147) of the element (141). The transparent element (141) may be a prism so that the optical path between the image intensifier (30) and the image pick-up device (50) is folded.

19 Claims, 2 Drawing Sheets

X-RAY EXAMINATION APPARATUS

BACKGROUND OF THE INVENTION

1. Field of the Invention

The invention relates to an X-ray examination apparatus, including an imaging screen for forming an image of an object or body to be examined, an image pick-up device having a pick-up face for converting said image into electric signals, and at least one illumination element for illuminating the pick-up face.

2. Description of the Related Art

An X-ray examination apparatus of this kind is known from U.S. Pat. No. 4,359,759. The cited document describes an X-ray apparatus which comprises an X-ray source for generating X-ray radiation whereby a part of a patient to be examined is irradiated. The shadow image thus formed is received by an image intensifier which forms an optical representation of the shadow image on the imaging screen. The optical representation is transferred, via an optical system, to the pick-up face of a television camera, after which the image can be processed by a signal processor and/or displayed on a monitor. The response time of the pick-up face of the television camera improves when light is incident thereon. Consequently, the optimum response time of the television camera is obtained only some time after activation of the X-ray source. This leads to a radiation load for the patient without diagnostically useful images being acquired. In order to achieve that the television camera has the desired response time already when the X-ray source is switched on, the known apparatus comprises a number of light-emitting diodes (LEDs) which are arranged on or in a plexiglass ring around the optical path from the image intensifier to the television camera. The side of the plexiglass ring facing the television camera is roughened so as to achieve diffusion of the light and hence uniform illumination of the pick-up face of the television camera.

It has been found that such a ring of LEDs is not very well suitable for obtaining a uniform light distribution on the pick-up face of the television camera. A second drawback of the known apparatus consists in that the plexiglass ring must be arranged at a sufficient distance from the television camera in order to ensure that the light emitted by the LEDs is incident on the pick-up face. This imposes restrictions in respect of the optical system between the image intensifier and the image pick-up device. Notably the realisation of a very compact construction of this part of the X-ray apparatus is hampered thereby. A further drawback consists in that the inner edge of the ring may be a source of undesirable reflections which may give rise to artefacts in the image picked up by the television camera.

SUMMARY OF THE INVENTION

It is inter alia an object of the invention to provide an apparatus for X-ray examination in which the response time is improved by making light incident on the pick-up face in a manner enabling uniform light distribution, in which a compact construction of the optical system can be achieved, and in which the risk of undesirable reflections is minimized.

To achieve this, an apparatus for X-ray examination in accordance with the invention is characterized in that a reflection system for reflecting light emitted by the at least one illumination element to the pick-up face is arranged in an optical path between the imaging screen and the pick-up face. As a result, the optical path of the light emitted by the illumination elements is folded, enabling a compact construction of the optical system. It has been found that a sufficiently uniform light distribution can thus be achieved.

In one embodiment, reflections of light, originating from the image intensifier are avoided in that the reflection system does not comprise reflective edges which are situated in or near the light beam between the image intensifier and the image pick-up device. This embodiment of the apparatus in accordance with the invention is characterized in that the reflection system comprises a transparent element which has an entrance face which faces the imaging screen and an exit face which faces the pick-up face, an optical path extending from the at least one illumination element to the pick-up face via reflection from the entrance face. An alternative or additional embodiment is characterized in that the reflection system comprises a transparent element having an entrance face and an exit face, an optical path from the at least one illumination element to the pick-up face extending via reflection from a side face of the transparent element. The transparent element is made of, for example, glass or a transparent synthetic material.

Preferably, the apparatus for X-ray examination in accordance with the invention is also characterized in that the transparent element comprises at least one recess, the illumination element being arranged in the recess. Thus, suitable optical positioning of the illumination elements relative to the entrance face of the transparent element is achieved and separate mechanical suspension of the illumination elements is not necessary.

A further embodiment of the apparatus for X-ray examination in accordance with the invention is characterized in that the at least one recess is provided with a mirror for reflecting light emitted by the illumination element to the entrance face. In this embodiment, the structural and the optical requirements are combined. By using a mirror, the recesses can be provided in a manner which is most attractive from a construction point of view, and the light of the illumination elements can be optimally directed onto the entrance face of the transparent element.

A preferred embodiment of the apparatus for X-ray examination in accordance with the invention is characterized in that the transparent element is a prism which is arranged in the optical path between the imaging screen and the pick-face, the entrance face of the prism enclosing an angle relative to the exit face of the prism, said recesses being provided in the entrance face. Using the prism, the image pick-up device can be arranged at an angle relative to the image intensifier so that it extends, for example perpendicularly thereto. This enables a very compact construction of the optical system of the X-ray apparatus. In this embodiment, the illumination element or illumination elements are provided on the side of the prism facing the image intensifier and the optical thickness of the prism is used to achieve a uniform light distribution on the pick-up face of the image pick-up device. The use of a transparent element in the form of a prism also offers the advantage that no additional element need be provided in the apparatus in order to illuminate the pick-up face.

An embodiment of the apparatus for X-ray examination in accordance with the invention is also characterized in that it includes four illumination elements in the form of light-emitting diodes (LEDs) which are arranged in regularly distributed positions around the optical path between the imaging screen and the pick-up face. It has been found that a number of four illumination elements arranged around the optical path provides sufficiently uniform illumination. LEDs are very suitable for use as illumination elements, because they are small, have a short response time, generate little heat, and emit light in a narrow wavelength range. The illumination can thus be suitably adapted to the spectral sensitivity of the pick-up element and fast switching is possible.

The invention also relates to a transparent element, for example a prism, which can be used in an apparatus for X-ray examination in accordance with the invention. Such a transparent element comprises an entrance face which is provided with at least one recess for accommodating an illumination element.

These and other, more detailed aspects of the invention will be described in detail hereinafter, by way of example, with reference to the drawing.

DETAILED DESCRIPTION OF THE PREFERRED EMBODIMENTS

Figure 1:
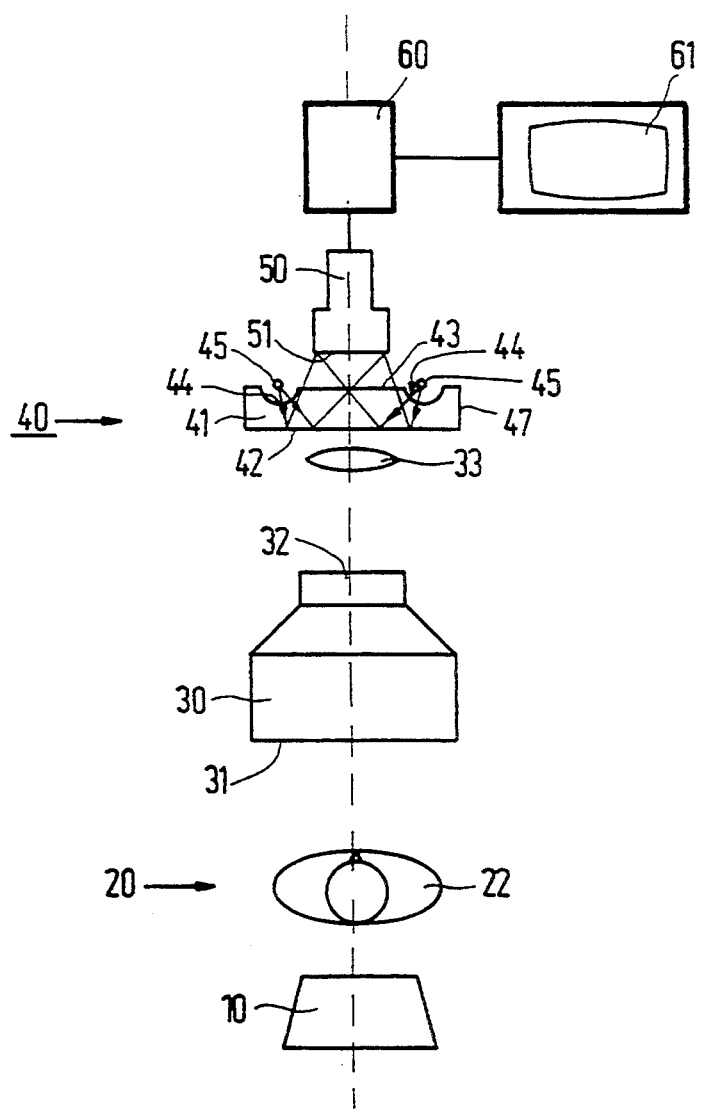
FIG. 1 shows a first embodiment of an apparatus for X-ray examination in accordance with the invention.

FIG. 1 shows diagrammatically an apparatus for X-ray examination. An X-ray source 10 is situated to one side of an examination space 20 in which, for example, a patient 22 can be arranged. To the other side of the examination space an image intensifier 30 is arranged opposite the X-ray source. The image intensifier 30 comprises an entrance screen 31 and an imaging screen 32. The imaging screen 32 is succeeded by an image pick-up device 50, for example a television camera comprising a pick-up face 51. The imaging screen is imaged on the pick-up face, for example by means of an optical system 33. The image pick-up device 50 is connected to a signal processing unit 60 and a monitor 61. It is also possible to couple the image pick-up device and the signal processing unit to other image processing equipment, for example a storage medium. The apparatus also comprises electric power supply units and control units which are not shown in the drawing.

When the X-ray source 10 is switched on, it emits X-rays in the direction of the patient 22 in the examination space 20. Due to density variations in the body of the patient, an X-ray shadow image is formed on the entrance screen 31 of the image intensifier 30. The image intensifier transfers this shadow image to its imaging screen 32 on which an image of the X-ray shadow image is formed in visible light. The image pick-up device 50 converts this image into an electric signal which is applied to the signal processing unit 60. After processing in the signal processing unit 60 or not, the image can be displayed on the monitor 61 and/or stored in a storage medium.

In an image pick-up device such as a television camera, the response time may be dependent on the light intensity intercepted briefly before by the image pick-up device. As a result, when the X-ray source is switched on, it will take some time before the image pick-up device reaches its optimum response time. During this time the patient is exposed to a radiation load even though no useful images for diagnosis can be picked up. In order to avoid this "dead time", the pick-up face 51 of the image pick-up device 50 is illuminated via a reflection system 40 arranged between the image intensifier 30 and the image pick-up device 50. Illumination takes place before and/or during the presence of an image on the imaging screen 32 of the image intensifier 30. Via a circuit (not shown), the illumination via the reflection system 40, can be switched off as soon as the X-ray source 10 is switched on. When the illumination is switched on in the presence of an image, a correction is performed, for example by subtracting a constant value from the intensities picked up.

In accordance with the invention, the illumination system comprises a reflection system 40 in the form of a transparent element 41 having a front face 42 which faces the image intensifier 30 and a rear face 43 which faces the image pick-up device 50. The transparent element 41 is arranged in the optical path between the image intensifier and the image pick-up device, without light from the image intensifier being obstructed thereby. The element 41 comprises one or more recesses 44 in which illumination elements 45, for example LEDs, are provided. The light emitted by the illumination elements is incident on the front face 42 from the rear and is reflected to the pick-up face 51 of the image pick-up device 50. Because this light is incident on the front face 42 at a large angle relative to the normal thereto, a large part of the light is reflected or even total internal reflection occurs. Instead of reflection from the front face, reflection can occur also from the side faces of element 41 or from the front face as well as from the side faces. If these side faces are not polished, a given degree of diffuse reflection also takes place, thus increasing the uniformity of the light distribution across the pick-face. As is indicated, the recesses 44 may be cavities in the rear of the transparent element 41 but may also be formed as holes extending through the entire thickness of the element, or as recesses in the edge of the element.

Figure 2:
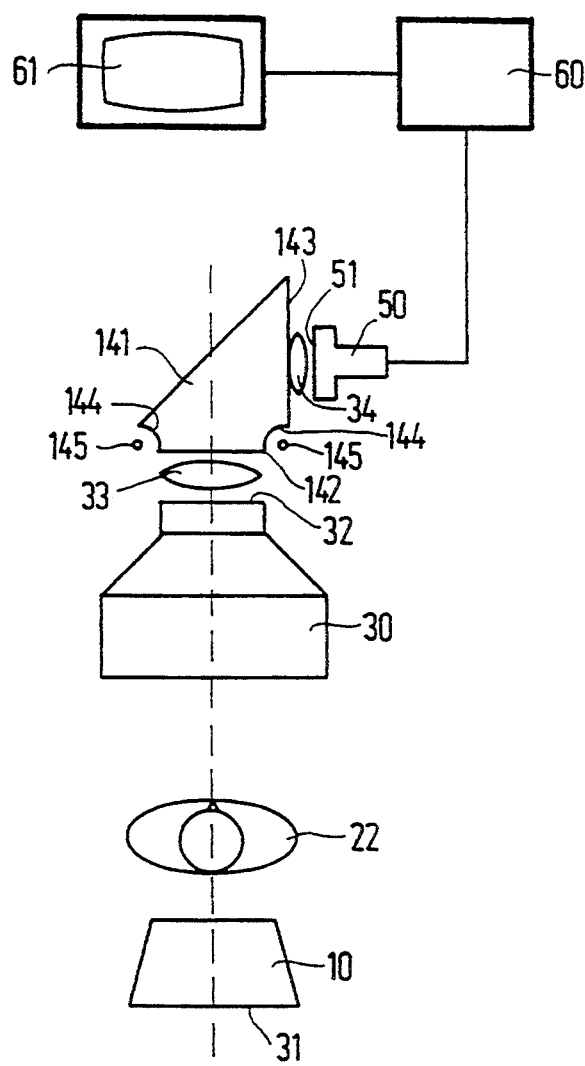
FIG. 2 shows a second embodiment of an apparatus for X-ray examination in accordance with the invention.

FIG. 2 shows a second embodiment of an apparatus for X-ray examination in accordance with the invention. This embodiment also comprises an X-ray source 10, an image intensifier 30, an image pick-up device 50, a signal processing unit 60 and a monitor 61. These components are comparable with those of the already described embodiment and, therefore, will not be described again. In the present embodiment, the pick-up face 51 of the image pick-up device 50 is tilted relative to the imaging screen 32 of the image intensifier 30. In the optical path between the image intensifier 30 and the image pick-up device 50 there is arranged a prism 141 whose oblique side acts as a mirror. The prism may form part of the optical system which is also shown to comprise the lenses 33 and 34. The advantage of this construction resides in the fact that less space is required along the longitudinal axis of the apparatus, so that the overall dimensions of the X-ray apparatus can be reduced. In the entrance face 142 of the prism 141, facing the image intensifier 30, there are provided recesses 144 in which illumination elements 145, for example LEDs are arranged. Light emitted by these illumination elements emerges, after reflection from the entrance face 142 and the oblique face of the prism 141, from the exit face 143 and is incident on the pick-up face 51 of the image pick-up device 50. Reflection from the side faces 147 of the prism 141 is also possible instead of or in addition to reflection from the entrance face 142. As has already been described with reference to FIG. 1, the response time of the image pick-up device is thus adjusted to the desired level or maintained at that level when the X-ray source 10 is not activated.

Figure 3A:
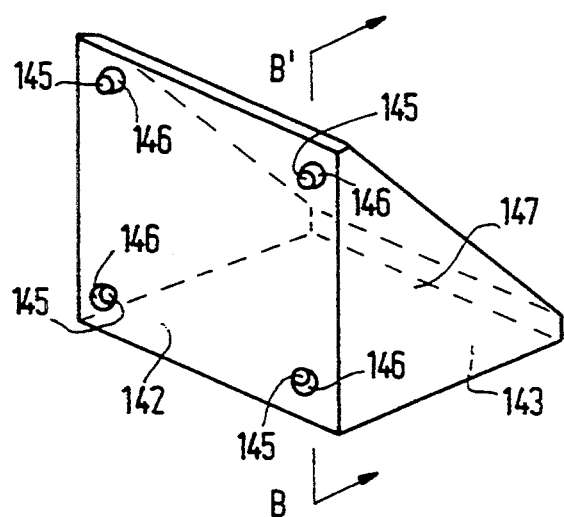
FIGS. 3a and 3b show a transparent element in accordance with the invention in the form of a prism and some details thereof.
Figure 3B:
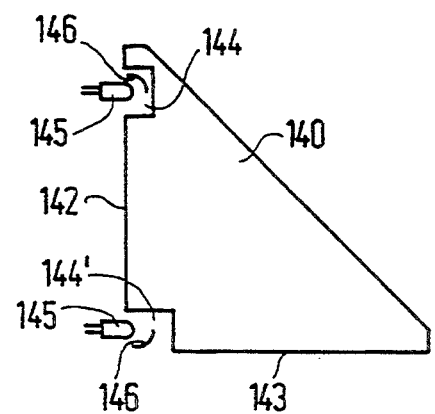

FIGS. 3a and 3b show some details of a prism as used in the apparatus shown in FIG. 2. FIG. 3a is a perspective view and FIG. 3b is a cross-sectional view taken along the line B—B'. The prism is formed by a half cube of a transparent material. The entrance and exit faces 142 and 143 are side faces of the cube. At the oblique side, along one of the diagonals of the cube, the light incident via the entrance face 142 is internally reflected to the exit face 143 by means of a reflective layer provided thereon or by total internal reflection. Near the four corners of the entrance face 142 there are provided recesses in which illumination elements 145 are provided. Adjacent the illumination elements there are provided reflectors 146 for reflecting light emitted by the illumination elements 145 in the direction of the entrance face 142. As has already been described, this light is then reflected from the entrance face and the reflective oblique side to the exit face 143 and the pick-up device.

FIG. 3b shows two feasible recesses with illumination elements. The recess 144 is a bore which extends in the prism and for the recess 144' a corner of the prism has been removed; this recess is open not only at the side of the entrance face 142 but also at one or both adjacent sides of the prism. In order to ensure that light emitted by the illumination elements 145 is incident as much as possible perpendicularly to the wall of the recess, the recesses preferably have a circular cross-section.

We claim:

1. An x-ray examination apparatus comprising an imaging screen for forming an image of an object or body to be examined, an image pick-up device comprising a pick-up face for converting said image into electrical signals, a transparent element in an optical path between said imaging screen and said pick-up face, and at least one illumination element positioned for illuminating the pick-up face via an optical path between said at least one illumination element and said pick-up face that includes an internal reflection from a face of said transparent element.

2. An X-ray examination apparatus as claimed in claim 1, characterized in that the transparent element has an entrance face which faces the imaging screen and an exit face which faces the pick-up face, said internal reflection being from the entrance face of the transparent element.

3. An X-ray examination apparatus as claimed in claim 1, characterized in that the transparent element has an entrance face which faces the imaging screen, an exit face which faces the pick-up face, and a further face between the entrance and exit faces, said internal reflection being from the further face of the transparent element.

4. An X-ray examination apparatus as claimed in claim 2, characterized in that the transparent element comprises at least one recess, the at least one illumination element being arranged in the recess.

5. An X-ray examination apparatus as claimed in claim 4, characterized in that the at least one recess is provided with a mirror for reflecting light emitted by the at least one illumination element to the entrance face.

6. An X-ray examination apparatus as claimed in claim 2, characterized in that the transparent element is a prism which has an entrance face which faces the imaging screen, an exit face which faces the pick-up face, the entrance face enclosing an angle relative to the exit face.

7. An X-ray examination apparatus as claimed in claim 2, characterized in that it includes four illumination elements in the form of light-emitting diodes (LEDs) which are arranged in regularly distributed positions around the optical path between the imaging screen and the pick-up face.

8. A transparent element for use in an optical path between an imaging screen and a pick-up face of X-ray examination apparatus, said transparent element comprising an entrance face for facing the imaging screen, an exit face for facing the pick-up face, and a further face between the entrance and exit faces, at least one of said exit and entrance faces being provided with at least one recess for accommodating an illumination element, said at least one recess being located so that an optical path between said illumination element and said exit face includes internal reflection from the entrance or further faces of said transparent element.

9. An X-ray examination apparatus as claimed in claim 2, characterized in that the transparent element has a further face between the entrance and exit faces, said optical path from the at least one illumination element to the pick-up face including an internal reflection from the further face of the transparent element following the internal reflection from the entrance face.

10. An X-ray examination apparatus as claimed in claim 3, characterized in that the transparent element comprises at least one recess, the at least one illumination element being arranged in the recess.

11. An X-ray examination apparatus as claimed in claim 10, characterized in that the at least one recess is provided with a mirror for reflecting light emitted by the at least one illumination element to the entrance face, said optical path from the at least one illumination element to the pick-up face including an internal reflection from the entrance face of the transparent element preceding the internal reflection from the further face.

12. An X-ray examination apparatus as claimed in claim 3, characterized in that the transparent element is a prism which is arranged in the optical path between the imaging screen and the pick-up face, the entrance face of the prism enclosing an angle relative to the exit face of the prism.

13. An X-ray examination apparatus as claimed in claim 4, characterized in that the transparent element is a prism which is arranged in the optical path between the imaging screen and the pick-up face, the entrance face of the prism enclosing an angle relative to the exit face of the prism, said at least one recess being provided in the entrance face.

14. An X-ray examination apparatus as claimed in claim 10, characterized in that the transparent element is a prism which is arranged in the optical path between the imaging screen and the pick-up face, the entrance face of the prism enclosing an angle relative to the exit face of the prism, said at least one recess being provided in the entrance face.

15. An X-ray examination apparatus as claimed in claim 5, characterized in that the transparent element is a prism which is arranged in the optical path between the imaging screen and the pick-up face, the entrance face of the prism enclosing an angle relative to the exit face of the prism, said at least one recess being provided in the entrance face.

16. An X-ray examination apparatus as claimed in claim 11, characterized in that the transparent element is a prism which is arranged in the optical path between the imaging screen and the pick-up face, the entrance face of the prism enclosing an angle relative to the exit face of the prism, said at least one recess being provided in the entrance face.

17. An X-ray examination apparatus as claimed in claim 3, characterized in that it includes four illumination elements in the form of light-emitting diodes (LEDs) which are arranged in regularly distributed positions around the optical path between the imaging screen and the pick-up face.

18. An X-ray examination apparatus as claimed in claim 5, characterized in that it includes four illumination elements in the form of light-emitting diodes (LEDs) which are arranged in regularly distributed positions around the optical path between the imaging screen and the pick-up face.

19. An X-ray examination apparatus as claimed in claim 11, characterized in that it includes four illumination elements in the form of light-emitting diodes (LEDs) which are arranged in regularly distributed positions around the optical path between the imaging screen and the pick-up face.

* * * * *